June 14, 1960 R. A. FIFER 2,940,091
AQUATIC DEVICE
Filed Nov. 25, 1958
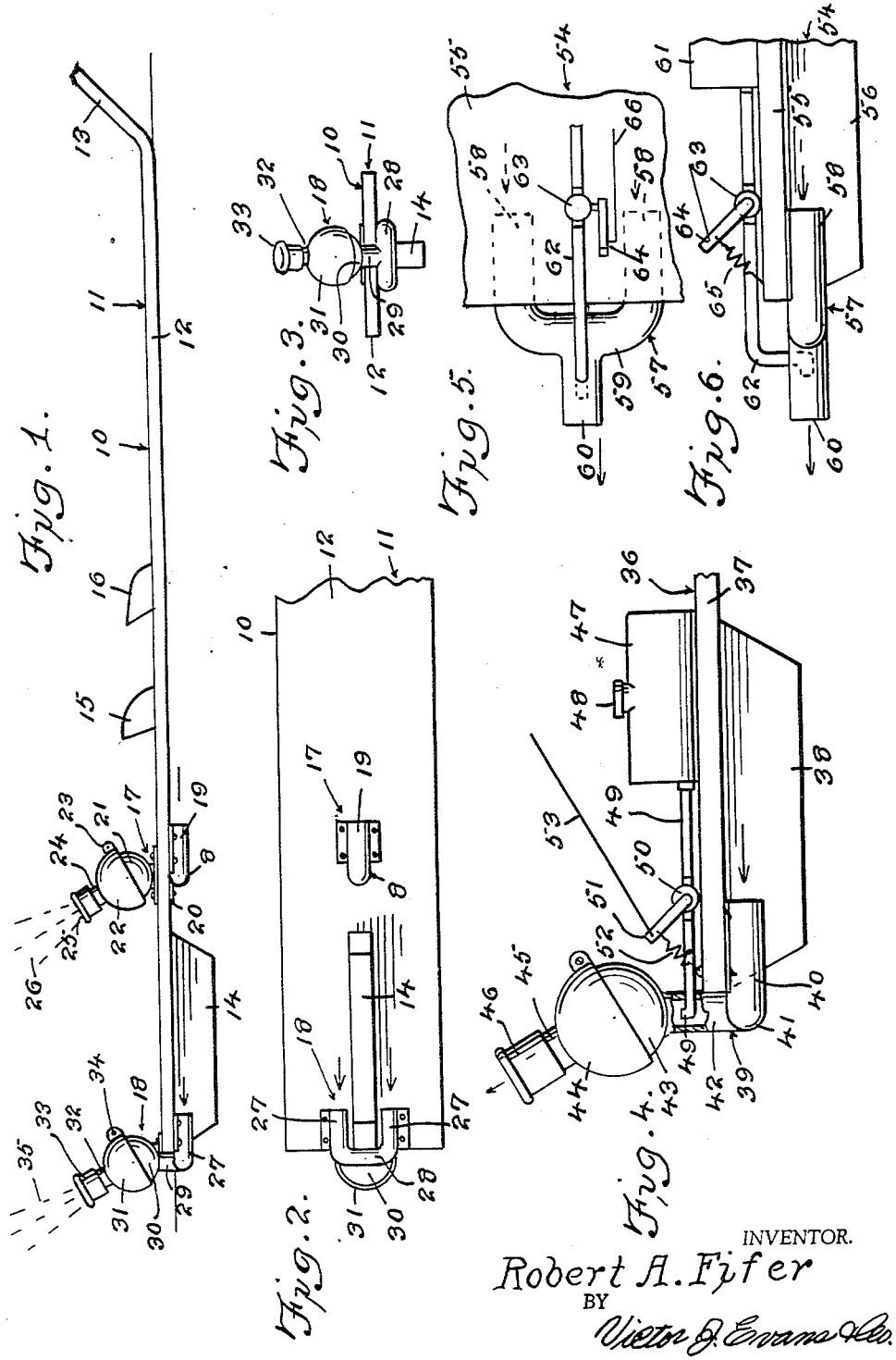
INVENTOR.
Robert A. Fifer
BY
Victor J. Evans & Co.
ATTORNEYS

United States Patent Office 2,940,091
Patented June 14, 1960

2,940,091

AQUATIC DEVICE

Robert A. Fifer, 517 N. 3rd St., Boise, Idaho

Filed Nov. 25, 1958, Ser. No. 776,270

3 Claims. (Cl. 9—310)

This invention relates to an aquatic device.

The object of the invention is to provide an aquatic device which is in the form of a novelty assembly whereby as the aquatic device which may be a water ski or the like, moves through a body of water, a stream of water or other fluid will be sprayed or ejected so as to create an unusual effect for novelty purposes or the like.

Another object of the invention is to provide an aquatic device which in one form of the invention consists of a spray device so as the water ski or other member moves through the body of water, water will be sprayed upwardly and rearwardly to create an unusual and novel arrangement which can be used for any desired purpose, and wherein in another form of the invention a colored fluid or liquid such as a dye may be sprayed upwardly or intermixed with the body of water so as to further increase the attractiveness of effectiveness of the assembly.

A further object of the invention is to provide an aquatic device which is extremely simple and inexpensive to manufacture.

Other objects and advantages will be apparent in the course of the following description.

In the accompanying drawings, forming a part of this application, and in which like numerals are used to designate like parts throughout the same.

Figure 1 is a side elevational view of the aquatic device of the present invention.

Figure 2 is a fragmentary bottom plan view of the device of Figure 1.

Figure 3 is a rear elevational view of the device in Figures 1 and 2.

Figure 4 is a fragmentary side elevational view, illustrating a modification, and with parts broken away and in section.

Figure 5 is a fragmentary top plan view of a further modification.

Figure 6 is a side elevational view of the device shown in Figure 5.

Referring in detail to the drawings and more particularly to Figures 1, 2, and 3 of the drawings, the numeral 10 indicates an aquatic device which includes a body member that is indicated generally by the numeral 11, and the body member 11 includes a main flat portion 12 and an upturned front end 13. A rudder 14 depends from the rear end of the body member 11, Figure 1. The numerals 15 and 16 indicate foot engaging members which are secured to the main flat portion 12.

According to the present invention there is provided first and second spray devices wich are indicated generally by the numerals 17 and 18. The first spray device 17 includes an L-shaped tube 8 which includes a horizontally disposed section 19 that is arranged below the main flat portion 12. The front end of the section 19 is open so that water can pass into the tube. The tube 8 further includes a vertically disposed section 20, and an arcuate casing 21 is connected to the upper end of the section 20.

The numeral 22 indicates an arcuate housing which is adjustably connected to the casing 21, and a screw assembly 23 is provided for maintaining the housing 22 immobile in its adjusted position on the casing 21. The numeral 24 indicates a discharge nozzle which extends upwardly from the housing 22, and a control member 25 is mounted on the upper end of the discharge nozzle 24. The numeral 26 indicates a spray of water which passes through the control member 25.

The spray device 18 includes a pair of spaced parallel horizontally disposed tube sections 27 which are arranged on opposite sides of the rudder 14 below the main flat portion 12, and the front ends of the tube sections 27 are also open so that water can enter the tube sections. A connection portion 28 extends between the tube sections 27, Figure 2, and a vertically disposed section 29 extends upwardly from the connecting portion 28. The numeral 30 indicates an arcuate casing which is connected to the upper end of the section 29, and an arcuate housing 31 is adjustably connected to the casing 30, there being a screw assembly 34 for maintaining the housing 31 immobile in its adjusted positions on the casing 30. The numeral 32 indicates a discharge nozzle which extends upwardly and rearwardly from the housing 31, and a control member 33 is mounted on the upper end of the nozzle 32, the numeral 35 indicating the spray of water which passes through the control member 33.

Referring now to Figure 4 of the drawings there is illustrated a modified aquatic device which is indicated generally by the numeral 36. The device 36 of Figure 4 includes a body member 37 which has a rudder 38 arranged contiguous to the lower rear end thereof, and the numeral 39 indicates a spray device which is mounted on the rear end of the body member 37. The spray device 39 includes a pair of horizontally disposed spaced apart tube sections 40 which have their front ends open, and a connecting portion 41 which extends between the tube sections 40. The numeral 42 indicates a vertically disposed section which extends upwardly from the connecting portion 41, and a casing 43 is arranged on the upper end of the tube section 42. An arcuate housing 44 is adjustably connected to the casing 43, and a discharge nozzle 45 extends upwardly from the housing 44 and has a control member 46 thereon.

Mounted on the body member 37 is a tank 47 which is adapted to hold a suitable quantity of a colored fluid such as a suitable dye, and a cap 48 can be removed as for example when the tank 47 is to be filled with dye or other fluid. A conduit 49 extends between the tank 47 and the upstanding portion 42 of the conduit, and a valve 50 is arranged in the conduit 49. A lever 51 is provided for actuating or opening and closing the valve 50, and a spring member 52 is connected to the lever 51. A cable or line 53 is also connected to the lever 51. The cable 53 may be pulled on to move the lever 51 as for example when the valve 50 is to open so that the dye from the tank 47 can pass through the conduit 49 and then enter the tube section 42. Due to the passage of water through the section 40, and through the sections 42, a suction effect will be created so that this dye will be sucked out from the tank whereby the fluid being sprayed out through the member 46 will be suitably colored so as to create or enhance the attractiveness thereof.

Referring now to Figures 5 and 6 there is illustrated a further modified aquatic device which is indicated generally by the numeral 54. The aquatic device 54 includes a body member 55 which has a rudder 56 depending from the rear end thereof, and the numeral 57 indicates a spray device arranged contiguous to the rear end of the body member 55. The spray device 57 includes a pair of horizontally disposed tube sections 58 which are arranged on opposite sides of the rudder 56, and the front ends of the tube sections 58 are open so that water may enter the same. The rear ends of the tube sections 58 are connected by a portion 59, and a horizontally disposed discharge pipe 60 extends rearwardly from the connecting portion 59. The rear end of the discharge pipe 60 is open so that a suitable colored fluid or dye can pass out through the pipe 60 and color the water in the vicinity of the rear of the aquatic device so as to increase the novelty effect.

The numeral 61 indicates a tank which is mounted on the body member 55, and a conduit 62 has one end connected to the tank 61 while the other end of the conduit 62 is arranged in engagement with the discharge pipe 60. An on and off valve 63 is arranged in the conduit 62, and a lever 64 is provided for actuating the valve 63. The numeral 65 indicates a spring which is connected to the lever 64 for normally maintaining the valve 63 closed. A control cable or line 66 is connected to the lever 64, so that when a person pulls on the cable 56, the tension of the spring 65 can be overcome whereby the lever 64 can be pivoted so as to open the valve 63 and permit the dye to pass from the tank 61 through the conduit 62 and then into the discharge pipe 60 so that this dye will serve to color the water.

From the foregoing, it is apparent that there has been provided an aquatic device and for example when using the device 10 shown in Figures 1, 2, and 3, it will be seen that a person's feet are adapted to be arranged in engagement with the members 15 and 16. It is to be understood that two of the members 10 may be used, so that one can be provided for each foot. The person on the members 10 may be towed behind a boat or the like, and as the device 10 moves through the water it will be seen that sprayed water such as the water 26 or 35 will be discharged outwardly and rearwardly so as to provide a highly novel effect which will increase the pleasure and uniqueness associated with water skiing and the like.

According to the present invention, as the device 10 moves along the body of water, the water will enter the tube sections 19 through the open front ends thereof and this water will then pass out through the vertical sections 20 and then pass through the casing 21 and out through the housing 22, and then this water will pass out through the nozzle 24 and control member 25 in the form of a spray 26. By loosening the screw assembly 23, the position of the housing 22 on the casing 21 can be changed so that the spray 26 can be made to travel or issue at different angles or directions. Similarly, by rotating the control member 25, the size of the spray 26 may be varied or changed as desired, so that in such instances a fine spray may be discharged, while in other instances a larger spray may be discharged.

At the same time, when using the device in Figures 1, 2, and 3 water will enter the pair of rearwardly disposed tube sections 27 and this water will travel through the connecting portion 28, and then through the vertical section 29, and this water will then pass through the casing 30, and then through the housing 31 and out through the discharge nozzle 32. This water is indicated by the numeral 35, so that it will be seen in Figure 1 a double spray effect is provided as the device 10 moves along the water. The screw assembly 34 can be loosened so as to permit adjustment of the housing 31, and similarly the control member 33 can be rotated so that different types of sprays can be produced or provided.

In the assembly shown in Figure 4, as the device 36 moves along the water, the water will enter the front ends of the tubes 40 and this water will then pass through the portion 41, and then up through the portion 42 and then through the casing 43, and this water will then pass through the housing 44 and out through the discharge nozzle 45. When desired, the cable 63 may be pulled on by the person using the device, so that the valve 60 can be opened and this will permit some of the dye or other colored fluid in the tank 47 to be sucked out through the conduit 49, so that this colored fluid will be mixed with the water as the water passes through the spray device so that the spray which passes out the discharge nozzle 45 will have a color which will increase the attractiveness or uniqueness of the spray. It is to be noted that as the water passes through the tube section 42, a suction effect is created which helps suck the dye from the tank 47. When pressure on the cable 53 is released, the spring 52 will return the lever 51 to a closed position so that the valve 50 will be shut off whereby no further fluid will pass out through the conduit 49. Also, the valve 50 may be adjusted to different positions so that the amount of colored fluid being dispensed can be varied as desired.

In Figures 5 and 6 there is shown a further modification wherein it will be seen that as the member 54 travels along the water, some of the water will enter the tube sections 58, and this water will then enter the connecting portion 59 and pass out through the horizontal discharge pipe 60. By pulling on the cable 66, the lever 64 can be moved against the tension of the coil spring 65 so that the valve 63 can be opened whereby some of the dye or other colored fluid in the tank 61 will pass out through the conduit 62 and into the discharge pipe 60. Thus, the fluid which passes out through the discharge pipe 60 can be colored as desired so as to impart a colored effect to the water in the vicinity of the rear of the device 54. Thus, in Figures 5 and 6 instead of spraying the water or colored fluid into the air as is done with the previous devices shown in Figures 1 through 4, the colored fluid or water is discharged directly into the main body of water on which the device is traveling.

The parts can be made of any suitable material and in different shapes or sizes.

The principle of the present invention can be used on water skis, surf boards, pleasure boats, or any other moving objects in which water velocity is able to cause the assembly to operate. Furthermore other types of devices can be used to cause the same effect, as for example a flat scoop arranged at an angle may be used, or tubes which may be bent or straight can be suitably mounted or arranged.

The housing 31 and casing 30 function as a ball and socket assembly and the housing can be adjusted relative to the casing so as to cause the device to be arranged at different angles. The spray devices can be attached by any suitable mounting means.

Thus, it will be seen that there has been provided a novelty assembly for use with water skis or the like and when the device is being used, a variable stream of water will be dispensed in the air or in the water behind the skier, and in certain instances dye can be injected so as to add color to the water or so as to permit water writing. The adjustable nozzle permits different patterns and volume to be dispensed and the water to be directed up or down or from side to side as desired. The use of the pair of tube sections 27 serve to equalize water resistance on each side of the rudder 14. If desired, a single scoop may be arranged behind the rudder or a scoop can be arranged on one side of the rudder only. The pipe 8 may have a vertical section 20 extending through a suitable opening in the portion 12. The valve such as the valve 50 or the valve 63 may be of the type which opens when pressure on the cable 63 is relaxed. If desired, the dye may be introduced directly to the water without drawing through the spray device.

Minor changes in shape, size and rearrangement of details coming within the field of invention claimed may be resorted to in actual practice, if desired.

I claim:
1. In an aquatic device, a body member including a main flat portion and upturned front end, foot engaging members on said main flat portion, a rudder depending from the rear of said main flat portion, first and second spray devices connected to said body member, said first spray device comprising an L-shaped tube which includes a horizontally disposed section arranged below said main flat portion, and which has its front end open, said tube further including a vertically disposed section extending through said main flat portion, an arcuate casing connected to the upper end of said vertically disposed section, an arcuate adjustable housing connected to said casing, a discharge nozzle connected to said housing, said second spray device comprising a pair of spaced parallel horizontally disposed tube sections arranged below said main flat portion and having their front ends open, a connecting portion extending between said tube sections, a vertically disposed section connected to said connecting portion, an arcuate casing connected to the upper end of said last named vertically disposed section, an arcuate adjustable housing connected to said last named casing, and a discharge nozzle connected to said last named housing.

2. In an aquatic device, a body member including a main flat portion, a rudder depending from the rear end of said main flat portion, a spray device arranged in the rear end of said body member and including a pair of spaced parallel horizontally disposed tube sections, arranged below said main flat portion and having their front ends open, a connecting portion extending between said tube sections, a vertically disposed section connected to said connecting portion, an arcuate casing connected to the upper end of said vertically disposed section, an arcuate adjustable housing connected to said casing, a discharge nozzle connected to said housing, a fluid holding tank supported on said body member, a conduit extending between said tank and said vertically disposed sections, a spring pressed valve connected to said conduit, and a cable for actuating said valve.

3. In an aquatic device, a body member provided with a depending rudder adjacent its rear end, a spray device connected to said body member and arranged contiguous to said rudder, said spray device comprising a pair of horizontally disposed tube sections arranged on opposite sides of said rudder and arranged below said body member, and said tube sections having their front ends open, a connecting portion extending between said horizontally disposed sections, a horizontally disposed discharge pipe extending rearwardly from said connecting portion and having its rear end open, a fluid holding tank supported on said body member, a conduit extending between said tank and said discharge pipe, a spring pressed valve connected to said conduit, and a cable for actuating said valve.

References Cited in the file of this patent
UNITED STATES PATENTS

| | | |
|---|---|---|
| 2,039,275 | McGreal | Apr. 28, 1936 |
| 2,061,198 | Kohut | Nov. 17, 1936 |
| 2,086,017 | Donahue | July 6, 1937 |
| 2,692,564 | Miller | Oct. 26, 1954 |
| 2,704,043 | Drier | Mar. 15, 1955 |
| 2,766,714 | Hammers | Oct. 16, 1956 |

OTHER REFERENCES

"Sunday Star," Washington, D.C., January 5, 1941, page 8.